US008027047B2

(12) United States Patent
Nakagawa

(10) Patent No.: US 8,027,047 B2
(45) Date of Patent: Sep. 27, 2011

(54) INFORMATION PROCESSING APPARATUS, CONTROL METHOD THEREOF, AND PROGRAM THEREOF

(76) Inventor: Isamu Nakagawa, Fujisawa (JP)

( * ) Notice: Subject to any disclaimer, the term of this patent is extended or adjusted under 35 U.S.C. 154(b) by 958 days.

(21) Appl. No.: 11/749,482

(22) Filed: May 16, 2007

(65) Prior Publication Data

US 2007/0273915 A1 Nov. 29, 2007

(30) Foreign Application Priority Data

May 29, 2006 (JP) ................................. 2006-149023

(51) Int. Cl.
*G06F 3/12* (2006.01)

(52) U.S. Cl. ..................... 358/1.14; 358/1.13; 358/1.15; 358/1.16; 358/1.17

(58) Field of Classification Search ......... 358/1.11–1.16
See application file for complete search history.

(56) References Cited

U.S. PATENT DOCUMENTS 6,061,669 A * 5/2000 Kelley et al. .................. 705/400
6,921,220 B2 * 7/2005 Aiyama .......................... 400/76
7,096,158 B2 * 8/2006 Kitada et al. .................. 702/185
7,172,260 B2 * 2/2007 Yoshida et al. ................... 347/7
7,177,034 B2 2/2007 Nakagawa et al.
7,756,749 B2 * 7/2010 Simpson et al. ................ 705/26
2004/0190057 A1 * 9/2004 Takahashi et al. ........... 358/1.15

FOREIGN PATENT DOCUMENTS

JP 11134136 5/1999
JP 2003248576 9/2003
JP 2004-287779 A 10/2004

OTHER PUBLICATIONS

Japanese Office Action dated May 9, 2011 regarding Japanese Application No. 2006-149023.

* cited by examiner

*Primary Examiner* — Chan S Park
(74) *Attorney, Agent, or Firm* — Fitzpatrick, Cella, Harper & Scinto

(57) ABSTRACT

An information processing apparatus according to this invention acquires function restriction information used to restrict the use of functions of an image processing apparatus. The apparatus acquires job log data of a job which is processed using the functions of the image processing apparatus. The apparatus changes the acquired function restriction information. The apparatus calculates a cost incurred upon using the functions of the image processing apparatus within a designated period, based on unit price information indicating the unit prices of the resources consumed upon using the functions of the image processing apparatus, the job log data, and the changed function restriction information. The apparatus outputs the calculation result.

13 Claims, 16 Drawing Sheets

FIG. 7

```
<ACT>
<UserName>Yamada</UserName>
<Role>GeneralUser</Role>
<DeviceAccessControl>
        <Duplex>Deny</Duplex>
        <PageLayout>2</PageLayout>
        <FullColor>Deny</FullColor>
</DeviceAccessControl>
</ACT>
```

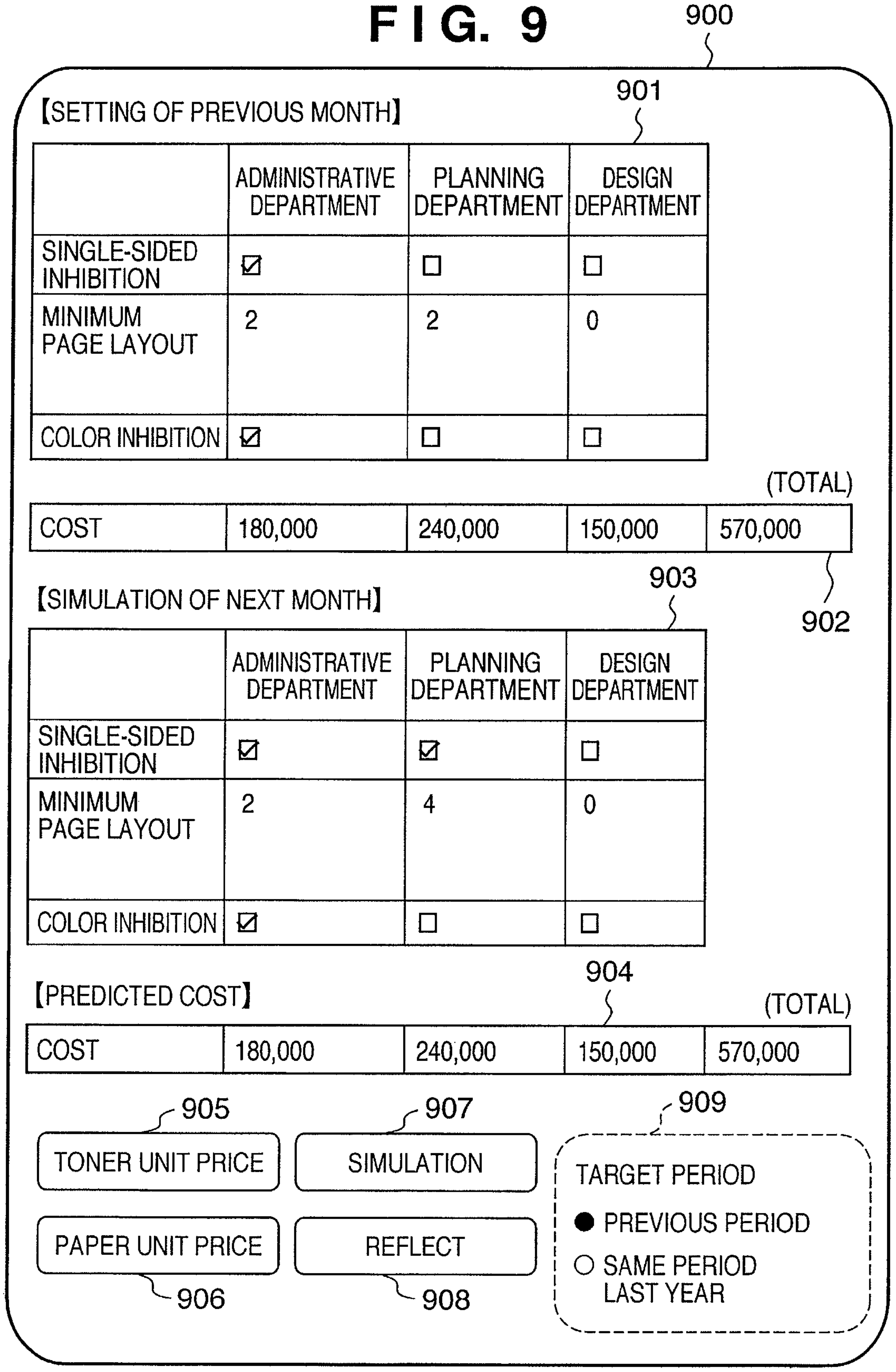

FIG. 9

[SETTING OF PREVIOUS MONTH]

|  | ADMINISTRATIVE DEPARTMENT | PLANNING DEPARTMENT | DESIGN DEPARTMENT |
|---|---|---|---|
| SINGLE-SIDED INHIBITION | ☑ | ☐ | ☐ |
| MINIMUM PAGE LAYOUT | 2 | 2 | 0 |
| COLOR INHIBITION | ☑ | ☐ | ☐ |

(TOTAL)

| COST | 180,000 | 240,000 | 150,000 | 570,000 |
|---|---|---|---|---|

[SIMULATION OF NEXT MONTH]

|  | ADMINISTRATIVE DEPARTMENT | PLANNING DEPARTMENT | DESIGN DEPARTMENT |
|---|---|---|---|
| SINGLE-SIDED INHIBITION | ☑ | ☑ | ☐ |
| MINIMUM PAGE LAYOUT | 2 | 4 | 0 |
| COLOR INHIBITION | ☑ | ☐ | ☐ |

[PREDICTED COST]

(TOTAL)

| COST | 180,000 | 240,000 | 150,000 | 570,000 |
|---|---|---|---|---|

- TONER UNIT PRICE
- PAPER UNIT PRICE
- SIMULATION
- REFLECT
- TARGET PERIOD
  - ● PREVIOUS PERIOD
  - ○ SAME PERIOD LAST YEAR

| SIZE / TYPE | PLAIN PAPER | RECYCLED PAPER | GLOSSY PAPER | OHP SHEET |
|---|---|---|---|---|
| A3 | P11 | P12 | P13 | P14 |
| A4 | P21 | P22 | P23 | P24 |
| B4 | P31 | P32 | P33 | P34 |
| B5 | P41 | P42 | P43 | P44 |

1100

1101

[ OK ] 1102

[ CANCEL ] 1103

FIG. 13

| ITEM | EXAMPLE |
|---|---|
| START TIME | 2005/11/19 17:48:30 |
| END TIME | 2005/11/19 17:50:40 |
| USER NAME | Yamada |
| DEPARTMENT NAME | PLANNING DEPARTMENT |
| ROLE | GENERAL USER |
| DOCUMENT NAME | USER NEEDS RESEARCH.doc |
| NUMBER OF LOGICAL PAGES | 12 |
| PAPER SIZE | A4 |
| PAPER TYPE | PLAIN PAPER |
| NUMBER OF SHEETS | 6 |
| NUMBER OF PAGES | 6 |
| PAGE LAYOUT | 2 |
| COLOR MODE | COLOR |
| SINGLE/DOUBLE | SINGLE |

FIG. 15

| | GeneralUser | Manager | Administrator |
|---|---|---|---|
| SINGLE-SIDED INHIBITION | ☑ | ☐ | ☐ |
| MINIMUM PAGE LAYOUT | 2 | 2 | 0 |
| COLOR INHIBITION | ☑ | ☐ | ☐ |

INFORMATION PROCESSING APPARATUS, CONTROL METHOD THEREOF, AND PROGRAM THEREOF

BACKGROUND OF THE INVENTION

1. Field of the Invention

The present invention relates to an information processing apparatus for calculating the cost incurred when functions of an image processing apparatus are used under restrictions imposed on the function, a method thereof and a program thereof.

2. Description of the Related Art

In recent years, copying machines have not only a function of copying documents, but also a plurality of different functions such as a function of printing print jobs from external clients, a function of digitally externally sending scanned documents using an e-mail or file transfer function, and the like. Such copying machine is called an MFP (Multi Function Peripheral).

The MFP has gained more functions, while a problem in terms of information management such as a high risk for information leakage due to possibility of externally sending scanned information or the like is posed. Although this is an old problem, since the cost of paper sheets and toners increases with increasing number of printed pages, a demand has arisen for restricting printable pages for each user.

To solve these problems, some solutions have already been proposed.

For example, Japanese Patent Laid-Open No. 11-134136 proposes a method of managing users using IDs, and restricting functions, resources, and times which are available for respective IDs.

Also, for example, Japanese Patent Laid-Open No. 2003-248576 proposes a peripheral device managing system which includes peripheral devices, and an information processing apparatus such as a PC or the like which is connected to the peripheral devices via a network. In this system, log information that includes the ID of the user who uses each peripheral device, print setting information (double-sided, single-sided), and discharged sheet count information is stored in a log information storage unit. In this proposal, the information processing apparatus collects and tabulates respective pieces of log information stored in the peripheral devices, and calculates and displays the difference between the number of sheets all printed in the double-sided mode and the actual number of discharged sheets based on the log information and a reduction ratio based on the difference.

However, the aforementioned prior arts cannot determine an actual cost reduction amount and cannot estimate a cost reduction amount in the future as a result of restrictions imposed on functions (to be simply referred to as function restrictions hereinafter). For this reason, it becomes difficult to change the function restrictions, and users often continue to use the system without changing the function restrictions.

However, since the amount of printing changes depending on the season, a season with a larger amount of printing may require extra function restrictions to further reduce the cost, and a season with a smaller amount of printing may result in a low cost constraint effect.

SUMMARY OF THE INVENTION

The present invention allows realization of an information apparatus, a method thereof, and a program thereof to implement appropriate function restrictions, and to easily figure out cost efficiency with respect to actual processing.

According to one aspect of the present invention, the foregoing problem is solved by providing an information processing apparatus for calculating a consumption amount of a resource upon using a function of an image processing apparatus, that processes a received job, within a range of function restriction information so as to simulate the consumption amount, the apparatus comprising a first acquisition unit adapted to acquire function restriction information used to restrict use of the function of the image processing apparatus, a second acquisition unit adapted to acquire job log data of a job processed using the function of the image processing apparatus, a change unit adapted to change the function restriction information acquired by the first acquisition unit, a calculation unit adapted to calculate the consumption amount of the resource upon using the function of the image processing apparatus based on the job log data acquired by the second acquisition unit and the function restriction information changed by the change unit, so as to simulate the consumption amount and an output unit adapted to output the calculation result of the calculation unit.

According to another aspect of the present invention, the foregoing problem is solved by providing a method of controlling an information processing apparatus for calculating a consumption amount of a resource upon using a function of an image processing apparatus, that processes a received job, within a range of function restriction information so as to simulate the consumption amount, the method comprising the steps of acquiring function restriction information used to restrict use of the function of the image processing apparatus, acquiring job log data of a job processed using the function of the image processing apparatus changing the acquired function restriction information, calculating the consumption amount of the resource upon using the function of the image processing apparatus based on the acquired job log data and the changed function restriction information so as to simulate the consumption amount, and outputting the calculation result.

Further features of the present invention will become apparent from the following description of exemplary embodiments with reference to the attached drawings.

BRIEF DESCRIPTION OF THE DRAWINGS

FIG. 7 shows a practical example of an ACT 107 according to the first embodiment of the present invention;

FIG. 9 shows a user interface example of a cost calculating application according to the first embodiment of the present invention;

FIG. 13 shows an example of a job log recorded by the job account server according to the first embodiment of the present invention;

FIG. 15 shows an example when function restrictions according to the second embodiment of the present invention are changed for respective roles.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
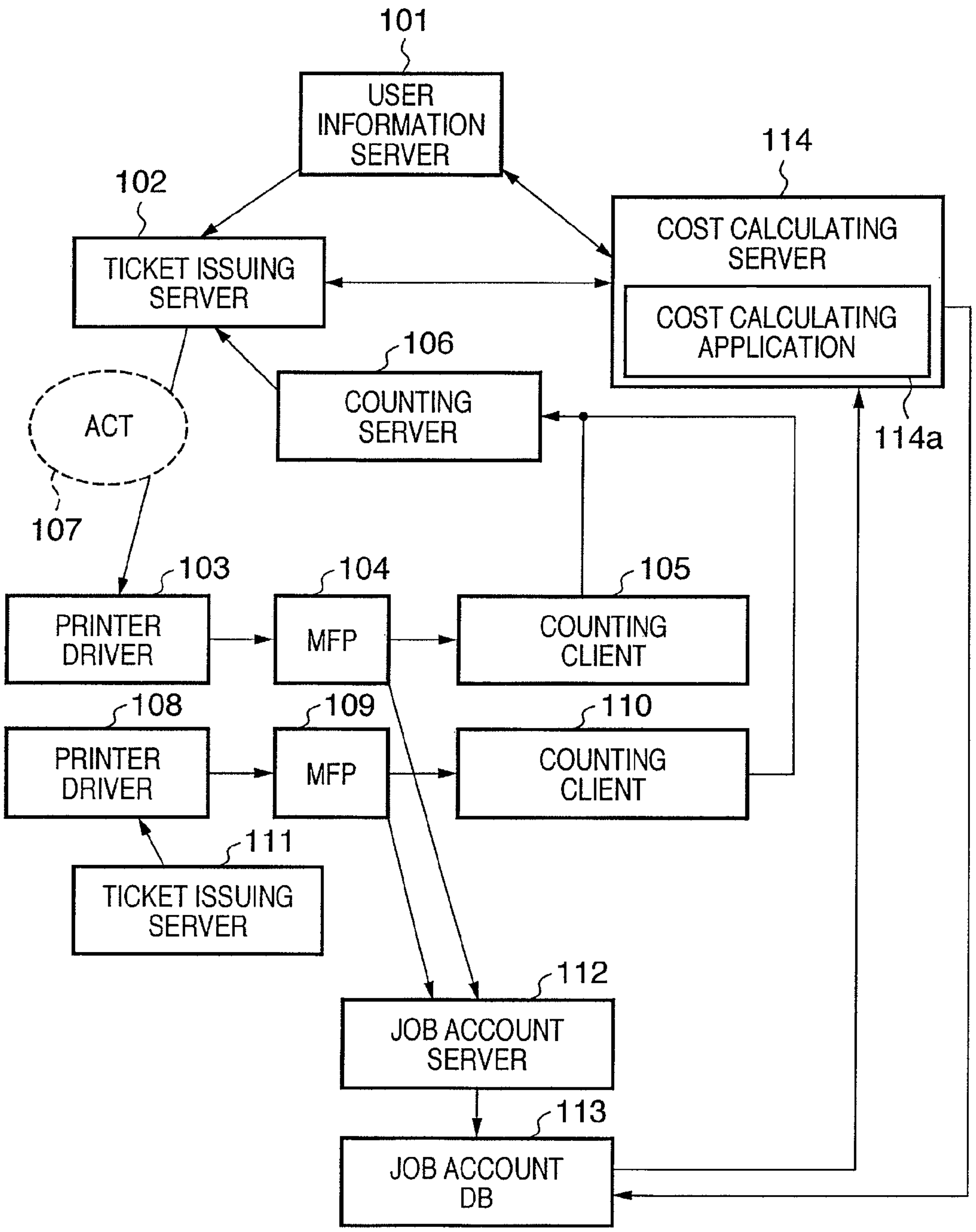
FIG. 1 is a block diagram showing the functional arrangement of a device managing system according to the first embodiment of the present invention.

FIG. 1 is a block diagram showing the functional arrangement of a device managing system according to the first embodiment of the present invention.

Referring to FIG. 1, reference numeral 101 denotes a user information server which holds user IDs and passwords, and function restriction information indicating functions each user is permitted to use in the system. The user information server 101 is implemented using a server, for example, an LDAP server, Active Directory server, or the like.

Note that LDAP is a short for Lightweight Directory Access Protocol.

Reference numeral 102 denotes a ticket issuing server. This ticket issuing server 102 issues a ticket that describes information about usable functions and an upper limit print count based on the function restriction information for each user managed by the user information server 101 and job execution records, stored in a counting server 106, of each user who issues jobs. This ticket is called an access control token (ACT) 107.

Reference numeral 103 denotes a printer driver. The printer driver 103 runs on a client PC (not shown). Upon using that client PC, the user must log in to that PC to identify who uses that client PC.

Reference numeral 104 denotes a multi function peripheral (MFP) as one of devices. The MFP 104 has not only a copy function of copying paper documents, but also a print function of printing print data sent from the external printer driver 103. Furthermore, the MFP 104 has a function (SEND function) of scanning paper documents and sending the scanned image data to an external file server or a mail address.

Reference numeral 105 denotes a counting client. The counting client 105 runs on each MFP, and notifies the counting server 106 of each user on that MFP.

The counting client 105 may tabularize the job execution records over a plurality of devices (e.g., printers). The job execution records include printed page counts and the like. In this way, the counting client 105 can hold job execution records of respective users in the data managing system.

Reference numeral 106 denotes a counting server. The counting server 106 tabularizes job execution records for respective users notified by the counting client 105 for a plurality of printing devices (in the first embodiment, the MFP 104 and an MFP 109). The counting server 106 then holds the print records of respective users in the whole system. In this case, the counting server 106 collects job execution records, which are acquired from the MFPs 104 and 109, via the counting client 105 and a counting client 110.

The ACT 107 is an access control token (ACT) which describes information about functions that each user can execute on the MFPs 104 and 109 or an upper limit printable page count for that user, as described above. The ticket issuing server 102 generates the ACT 107 based on an ACT issuing request from the printer driver 103 to the ticket issuing server 102, and returns the generated ACT 107 to the printer driver 103.

The printer driver 103 appends that ACT 107 to a print job, and sends the print job to the MFP 104 or 109. That is, the ACT 107 is passed from the ticket issuing server 102 to the MFP 104 or 109 via the printer driver 103.

A printer driver 108, the MFP 109, the counting client 110, and a ticket issuing server 111 make the same operations as those of the aforementioned ones.

Reference numeral 112 denotes a job account server. The job account server 112 acquires job logs from the MFPs 104 and 109, and stores them in a job account database (DB) 113 which serves as a job log database. By searching this job account DB 113, the job outputs of the whole device managing system can be analyzed.

Reference numeral 114 denotes a cost calculating server which calculates the cost using a cost calculating application 114*a*. Principal functions of the cost calculating application 114*a* include a cost calculating module associated with print cost according to the function restrictions of the device for respective users or departments. Also, the principal functions include a cost calculation UI control module which allows for changing the function restrictions of the device for respective users or departments via a cost calculation window (FIG. 9: to be described later) and displays the print cost required after change. Note that details of the processing of the cost calculating application 114*a* will be described later.

A sequence of operations from creation of a job until counting of job execution records will be described below.

(1) The printer driver 103 sends an ACT issuing request appended with identification of a user who wants to issue a job to the ticket issuing server 102.

(2) The ticket issuing server 102 acquires function restriction information corresponding to the user who wants to issue a job, of those stored in the user information server 101.

(3) The ticket issuing server 102 further acquires the job execution record corresponding to the user who issued an ACT send request from the counting server 106.

(4) The ticket issuing server 102 determines setting contents of a job permitted to the user based on the acquired function restriction information and job execution record.

(5) The ticket issuing server 102 generates an ACT 107 that reflects the determined setting contents of the job. The ticket issuing server 102 appends a digital signature to the ACT 107 to prove that the ticket issuing server 102 issued that ACT, and sends the ACT 107 to the printer driver 103.

(6) The printer driver 103 outputs the job and ACT 107 to the MFP 104 or 109 to control it to execute the job.

(7) The counting client 105 collects the records in the MFPs 104 and 109.

(8) The counting client 105 sends the collected records to the counting server 106.

(9) The job account server 112 collects job logs (job log data) from the MFPs 104 and 109 and stores them in the job account DB 113 which serves as a job log database.

(10) The cost calculating server 114 calculates the cost and changes the function restrictions using the cost calculating application 114*a*.

Note that the device managing system of the first embodiment is configured by the devices, servers, and client PCs connected on the network. As this device managing system, the first embodiment will exemplify a print managing system which imposes limitations on accesses and restrictions on job execution such as printable counts and the like by users who use the devices. Note that the users include individual users, departments, organizations, and the like.

One layout example of respective functional elements in the device managing system shown in FIG. 1 will be described below using FIG. 2.

Figure 2:
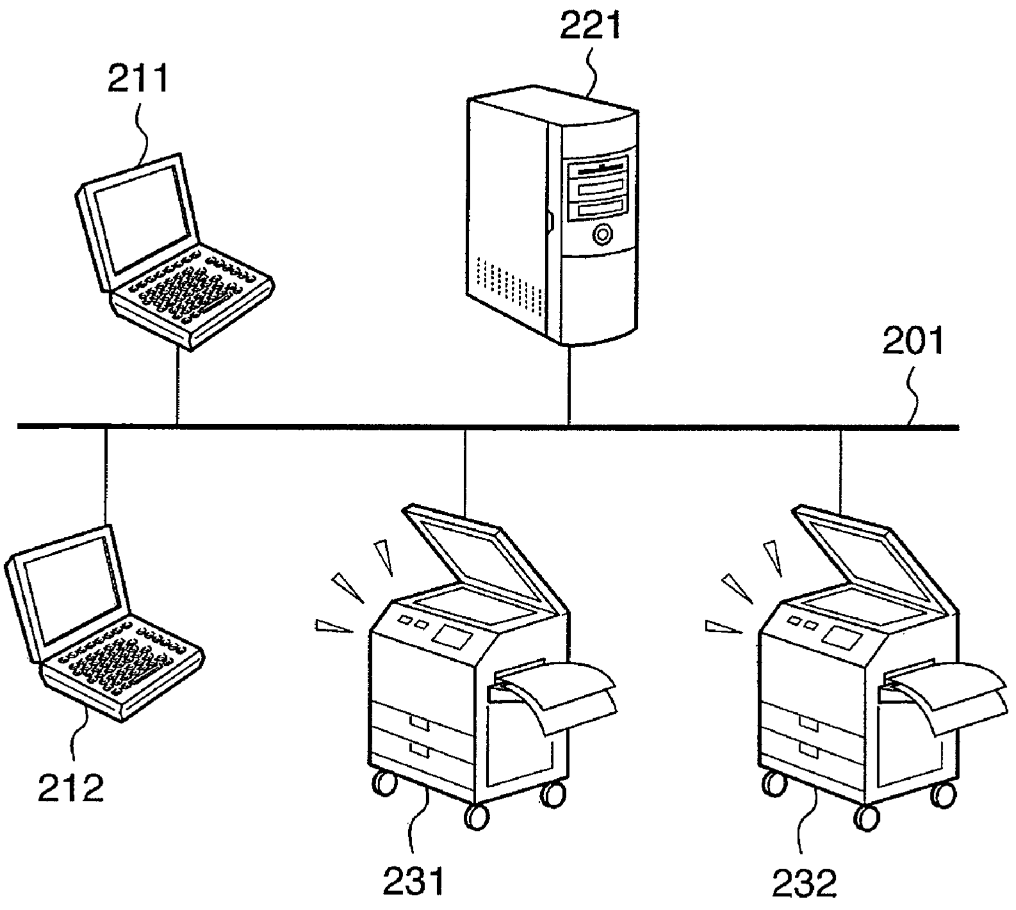
FIG. 2 is a view showing one layout example of respective functional elements in the device managing system according to the first embodiment of the present invention.

FIG. 2 shows one layout example of respective functional elements in the device managing system according to the first embodiment of the present invention.

Referring to FIG. 2, reference numerals 211 and 212 denote client PCs. The printer drivers 103 and 108 in FIG. 1 run on the client PC 211 or 212.

Reference numeral 221 denotes a server PC. The user information server 101, ticket issuing server 102, counting server 106, and job account server 112 shown in FIG. 1 run on the server PC 221. Note that various servers shown in FIG. 1 may run on one server PC 221. Alternatively, various servers shown in FIG. 1 may run on individual server PCs 221 depending on their use applications or purposes intended, or they may run on one server PC 221 in arbitrary combinations.

For example, the functions of the user information server 101, ticket issuing server 102, counting server 106, and job account server 112 may be consolidated to form a function restriction server used to manage the function restrictions of the MFPs 104 and 109 as devices. In this case, this function restriction server comprises a function restriction database which at least manages function restriction information of each device for predetermined units (e.g., users, departments, roles, and the like). Also, the function restriction server comprises an ACT issuing unit which issues an ACT with reference to that function restriction database, and an edit UI control unit which edits the function restriction information via a UI.

Note that the function restriction information is used to give the instruction for permission or inhibition of use of each function provided by the device. The device has a plurality of types of functions such as PDL print, copy, FAX, send, and the like, and the function restriction information can give the instruction for permission or inhibition of use of each function. Also, the function restriction information can restrict the amount of output for each function or can restrict the output format. The function restriction information can be managed for respective users or can be managed for respective groups (departments) including one or more users or for respective roles.

Reference numerals 231 and 232 denote image processing apparatuses (e.g., multi function peripherals) which correspond to the MFPs 104 and 109 shown in FIG. 1.

The client PCs 211 and 212, server PC 221, and image processing apparatuses 231 and 232 are connected to each other via a network 201, and exchange information via the network 201.

Note that the network 201 is typically implemented by one of the Internet, a LAN, WAN, telephone line, dedicated digital line, ATM or frame relay line, communication satellite line, cable TV line, data broadcast wireless line, and the like. Or the network 201 is a so-called communication network implemented by a combination of these lines, and need only be used to exchange data.

The configuration shown in FIG. 11*s* merely an example. For this reason, all of the clients, servers, and printer drivers except for the MFPs in FIG. 1 may be implemented on client computers or they may be implemented using some server computers.

Interfaces between neighboring building components of the system in FIG. 1 may respectively be physical communication media such as a CPU bus and the like or may be configured by logical interfaces for message communications implemented by software. The aforementioned functional components may execute respective functions when a CPU executes programs, or may be implemented as hardware circuits.

Note that the interfaces between the neighboring building components in the system shown in FIG. 1 include, for example, an interface between the printer driver 103 and ticket issuing server 102, and an interface between the ticket issuing server 102 and counting server 106. Also, the interfaces include an interface between the ticket issuing server 102 and user information server 101, and an interface between the counting client 105 and counting server 106.

The client PCs 211 and 212 belong to the same domain as the server PC 221 on which the user information server 101 runs, and user IDs and passwords are managed by the user information server 101. When the user uses the client PC 211 or 212, he or she must log on to the domain at the beginning of use.

An example of the internal arrangement of an information processing apparatus which implements the client PC 211 or 212 or the server PC 221 will be described below using FIG. 3.

Figure 3:
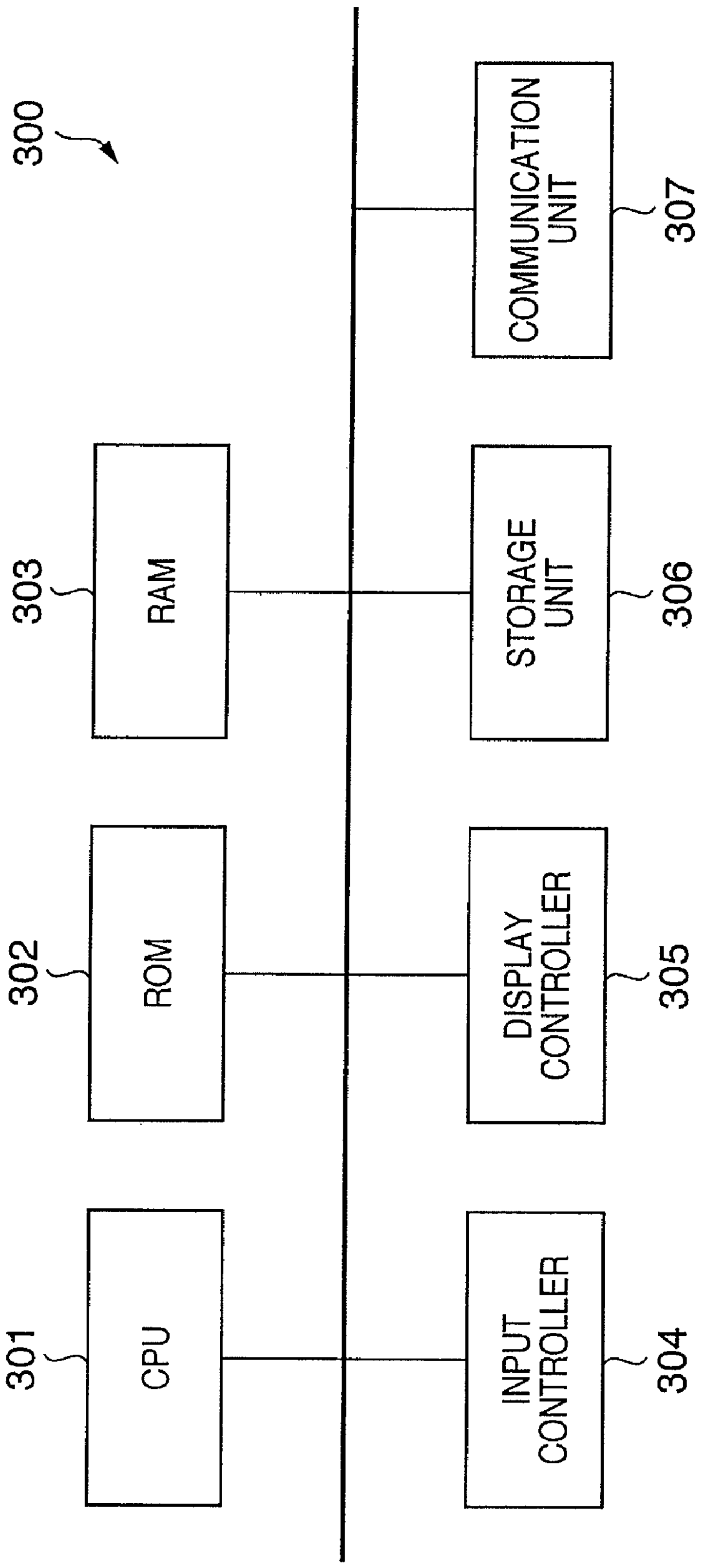
FIG. 3 is a block diagram showing the arrangement of an information processing apparatus according to the first embodiment of the present invention.

FIG. 3 is a block diagram showing the arrangement of an information processing apparatus according to the first embodiment of the present invention.

Referring to FIG. 3, reference numeral 301 denotes a CPU, that is, a central processing unit, which executes control, arithmetic processing, and the like of the overall computer apparatus. Reference numeral 302 denotes a ROM, that is, a read-only memory, which provides a storage area of various data such as a system startup program, applications, parameters, and the like. Reference numeral 303 denotes a RAM, that is, a random-access memory, which provides a data storage area free from use limitations. This RAM 303 provides an area on which programs such as an operating system, applications, device drivers, communication control programs, and the like are loaded and executed.

Reference numeral 304 denotes an input controller which receives input data from a keyboard and pointing device (e.g., a mouse) as input devices, and transfers the received data to the CPU 301. Reference numeral 305 denotes a display controller which executes display control of a display device. Note that the display device includes a CRT, LCD, and the like.

Reference numeral 306 denotes a storage unit. This storage unit 306 is a so-called external storage device, which includes, for example, a floppy® disk drive, hard disk drive, and SRAM (nonvolatile memory). This storage unit 306 stores programs and data, and refers to or loads them onto the RAM 303 as needed when they are executed. Reference numeral 307 denotes a communication unit which executes network communication control, and can communicate with other computers (e.g., PCs) and peripheral devices (e.g., the MFP 104) connected on the network 201 shown in FIG. 2. Reference numeral 308 denotes a system bus which interconnects the aforementioned building components and implements a data exchange channel.

An example of the internal arrangement of the device (image processing apparatus) which implements the multi function peripheral 231 or 232 will be described below using FIG. 4.

Figure 4:
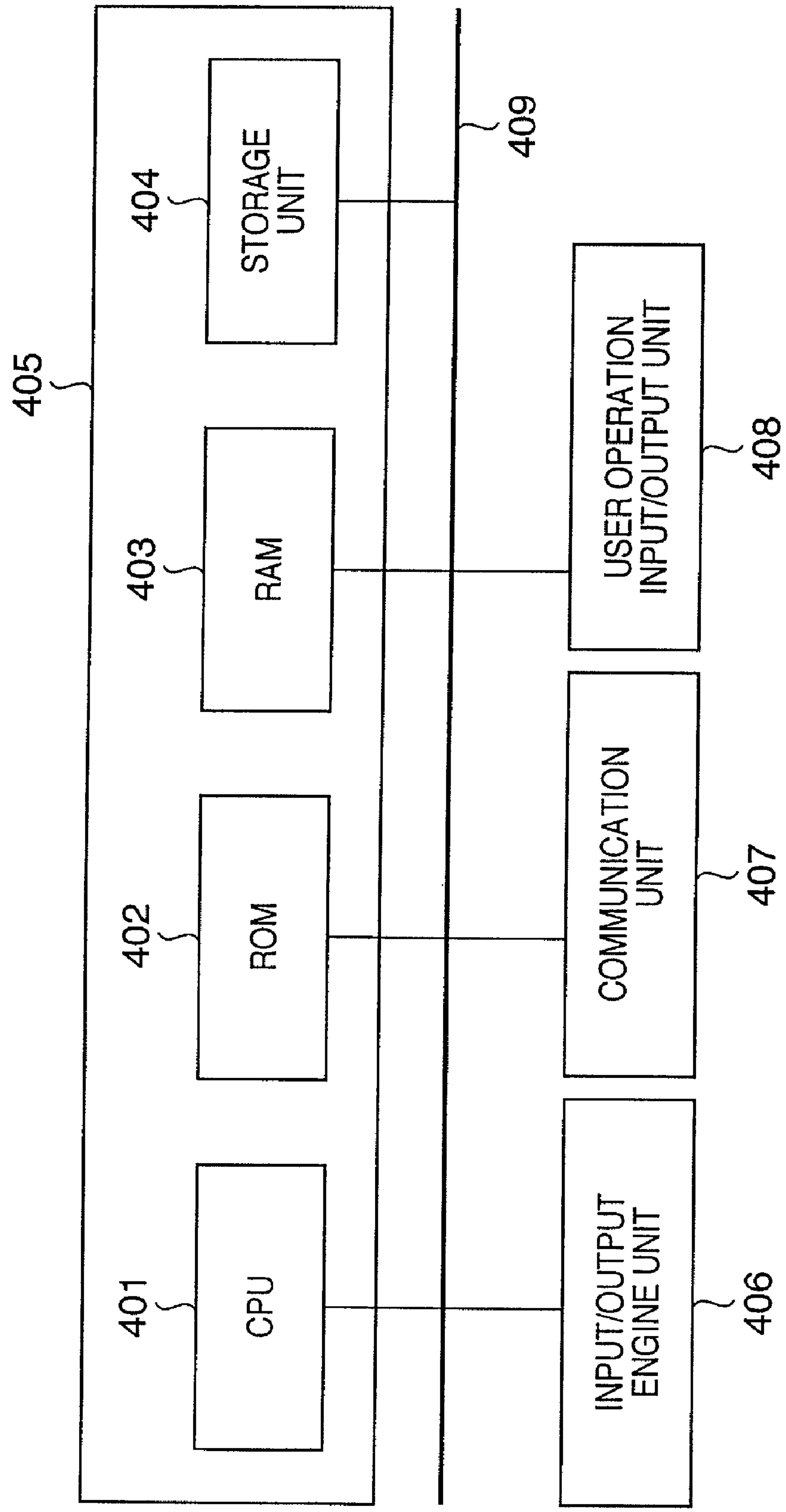
FIG. 4 is a block diagram showing the arrangement of a device according to the first embodiment of the present invention.

FIG. 4 is a block diagram showing the arrangement of the device according to the first embodiment of the present invention.

Referring to FIG. 4, reference numeral 405 denotes a controller unit which controls the overall device. As the internal arrangement of the controller unit 405, reference numeral 401 denotes a CPU, that is, a central processing unit, which executes control, arithmetic processing, and the like of this controller unit 405. Reference numeral 402 denotes a ROM, that is, a read-only memory, which provides a storage area of various data such as a system startup program, applications, parameters, and the like. Reference numeral 403 denotes a RAM, that is, a random-access memory, which provides a data storage area free from use limitations. Reference numeral 404 denotes a storage unit. This storage unit 404 is a so-called external storage device, which includes, for example, a hard disk drive, SRAM, and the like.

This RAM 403 provides an area on which programs such as an operating system, communication control programs, engine control programs, and the like are loaded and executed. Reference numeral 406 denotes an input/output engine unit which executes a print operation and image scanning operation under the control of the controller unit 405. As a practical example, the input/output engine unit 406 comprises a printer engine which executes printing based on a print system such as a laser beam system or the like, and a scanner engine which has a paper feed mechanism such as an ADF or the like.

Reference numeral 407 denotes a communication unit which executes network communication control, and can communicate with PCs which serve as client computers and server computers on the network 201 shown in FIG. 2. Reference numeral 408 denotes a user operation input/output unit, which makes interactive setting operations with the user. This user operation input/output unit 408 comprises, for example, a touch panel, an input device including various keys, buttons, and the like, and a display device. Reference numeral 409 denotes a system bus, which interconnects the aforementioned building components and implements a data exchange channel.

An example of the functional arrangement of the MFP 104 or 109 will be described below using FIG. 5.

Figure 5:
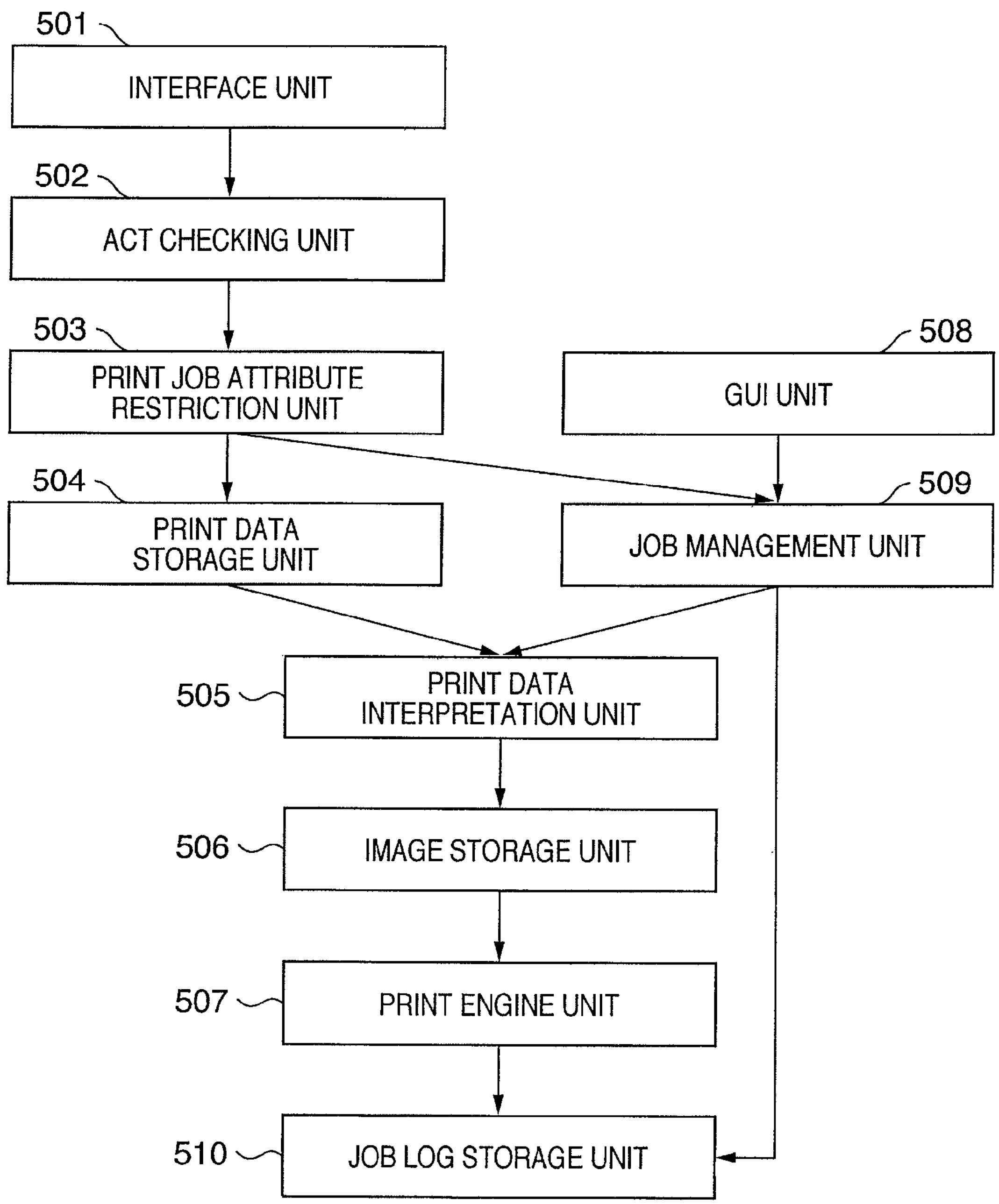
FIG. 5 is a block diagram showing the functional arrangement of an MFP according to the first embodiment of the present invention.

FIG. 5 is a block diagram showing the functional arrangement of the MFP according to the first embodiment of the present invention.

Referring to FIG. 5, the MFP 104 (multi function peripheral 231) or 109 (multi function peripheral 232) receives a print job (job data) from the client PC 211 or 212.

Reference numeral 501 denotes an interface unit which receives a print job. Reference numeral 502 denotes an ACT checking unit 502 which interprets the received print job to check if a restriction ticket is appended. Reference numeral 503 denotes a print job attribute restriction unit which restricts (degenerates) attribute information of the print job based on the restriction information described in an ACT and notifies the subsequent units of that attribute information, when the ACT is appended.

Reference numeral 508 denotes a GUI (Graphical User Interface) unit, which controls a control panel (not shown) to set and display the operation of the print job restriction unit 503. Reference numeral 504 denotes a print data storage unit, which temporarily stores print data, i.e., PDL (Page Description Language) data included in the print job.

Reference numeral 509 denotes a job management unit, which temporarily stores attribute information such as the user name of the print job, its role, the number of logical pages, page layout information, the number of pages to be printed and monochrome/color designation, a paper type, and the like. A print data interpretation unit 505 executes image forming processing by acquiring PDL data from the print data storage unit 504 in accordance with the attribute information stored in the job management unit 509, thus generating image data.

Reference numeral 506 denotes an image storage unit, which temporarily stores the image data generated by the print data interpretation unit 505 until its printing is completed. Reference numeral 507 denotes a print engine unit, which actually prints image data stored in the image storage unit 506 on media such as print sheets and the like using a known print technique such as an electrophotography technique, ink-jet technique, or the like.

Reference numeral 510 denotes a job log storage unit, which records the attributes of the job such as the user name, role, and the like stored in the job management unit 509, and the print result such as the number of pages, the number of sheets, color mode, and the like of the print processing by the print engine unit 507, upon completion of execution of the job.

An example of job data will be described below using FIG. 6.

Figure 6:
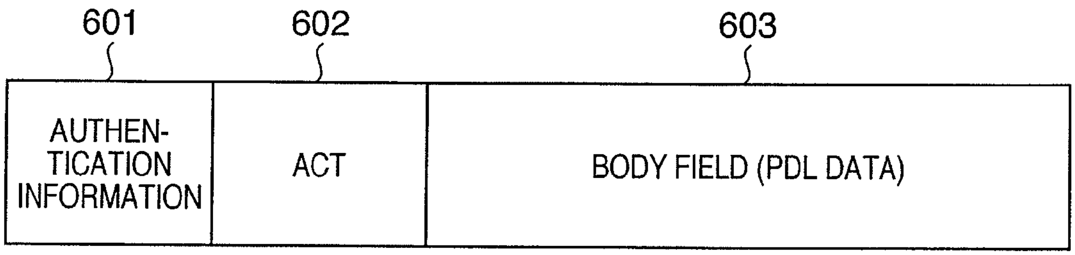
FIG. 6 shows job data according to the first embodiment of the present invention.

FIG. 6 shows job data according to the first embodiment of the present invention.

The job data includes authentication information 601 which indicates who the user that issued the job is, an access control ticket or token 602, and a body field 603 indicating the job contents to be requested to the MFP. The body field 603 includes PDL data. Note that the access control token 602 shown in FIG. 6 corresponds to the access control token (ACT) 107 which is received by the printer driver 103 from the ticket issuing server 102 in FIG. 1.

Upon reception of the job data, the MFP 104 compares a list of available functions described in the access control ticket 602 of the received job data with the request contents described in the body field 603. As a result, if the request contents are included in the available functions, the MFP 104 executes the job in accordance with the request contents. Otherwise, the MFP 104 cancels that job.

A practical example of the ACT 107 will be described below using FIG. 7.

FIG. 7 shows a practical example of the ACT according to the first embodiment of the present invention.

The ACT has an XML (Extensible Markup Language) format, and is described in the form of <tag>contents</tag>. <UserName>Yamada</UserName> of the ACT in FIG. 7 indicates that the user name is Yamada. The user name is used in user authentication when the user logs on to the client PC.

Tags <Role>-</Role> indicate that a role upon determining function restrictions is User. Tags <DeviceAccessControl>-</DeviceAccessControl> indicate functions of the MFP that are permitted or inhibited for use.

Tags <Duplex>-</Duplex> indicate permission or inhibition of double-sided printing, and "Deny" indicates that double-sided printing is inhibited. Tags <PageLayout>-</PageLayout> indicate a minimum page layout, and that it is 2. "Minimum page layout" indicates the minimum number of logical pages (pages of a document) to be laid out per face of a sheet. For example, if the value of "minimum page layout" is 2, it indicates that two or more logical pages are indispensable to be laid out per face of a sheet. Tags <FullColor>-</FullColor> indicate permission or inhibition of color printing, and "Deny" indicates that color printing is inhibited.

The operation of the job account server 112 will be described below using FIG. 8.

Figure 8:
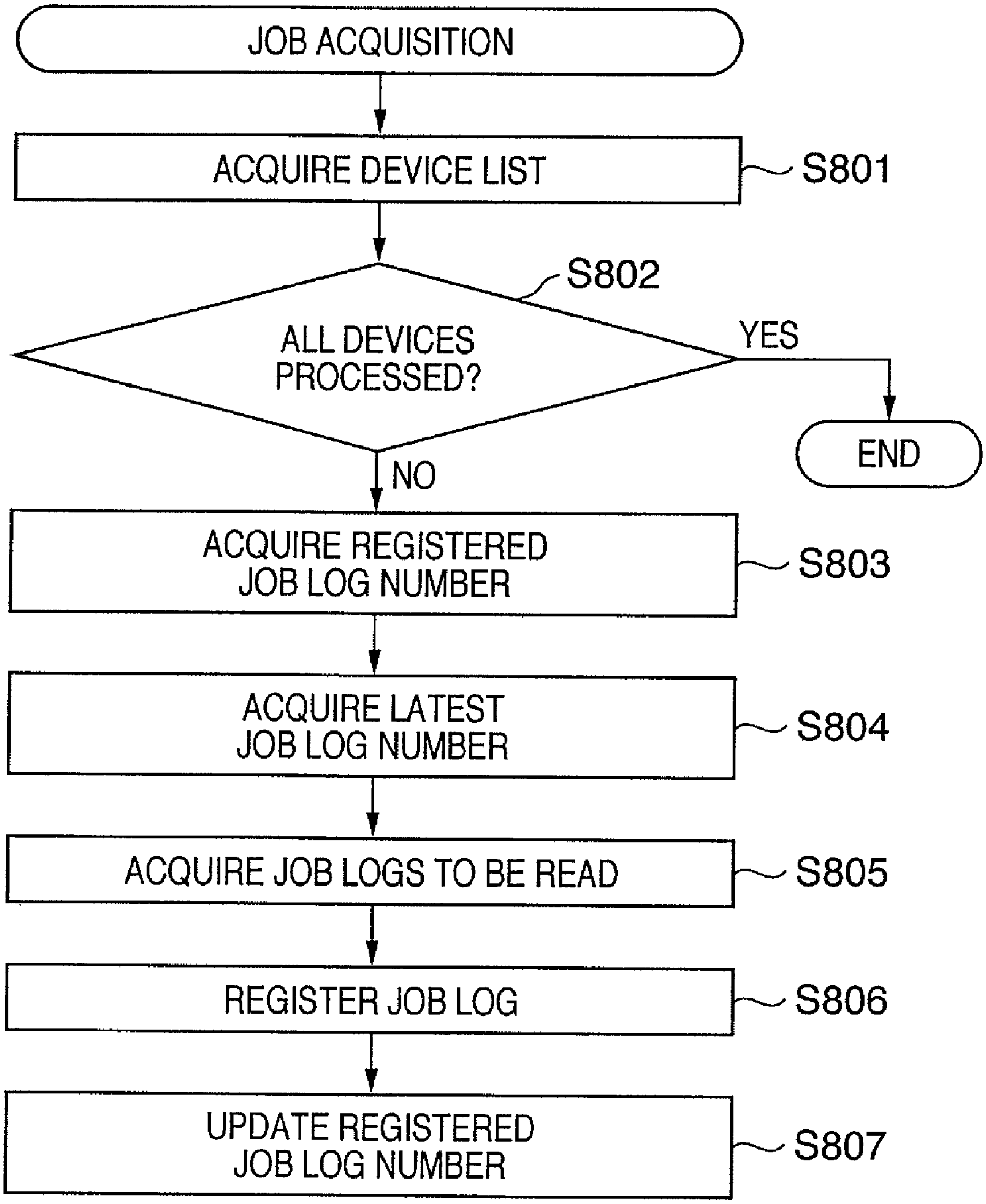
FIG. 8 is a flowchart showing the operation of a job account server according to the first embodiment of the present invention.

FIG. 8 is a flowchart showing the operation of the job account server according to the first embodiment of the present invention.

Note that the flowchart shown in FIG. 8 is implemented when the CPU 301 of the job account server 112 executes a program stored in, for example, the ROM 302.

In step S801, the CPU 301 acquires a device list under the management of the job account server 112 from the storage unit 306. This device list manages device information about respective devices such as the MFPs 104 and 109.

The CPU 301 then checks in step S802 if all processes about devices on the device list acquired in step S801 are complete. If all the processes are complete (YES in step S802), the CPU 301 ends the processing. If all the processes are not complete yet (NO in step S802), the process advances to step S803.

In step S803, the CPU 301 acquires a registered job log number from the storage unit 306. Each of the MFPs 104 and 109 records a job log and appends a job log number used to uniquely specify the job log upon completion of a job. Note that the job log number is an integer which increments one by one from 1.

In step S804, the CPU 301 acquires the latest job log number from a target device. In step S805, the CPU 301 acquires logs (job logs) to be read from the target device. Note that the difference between the latest job log number acquired in step S804 and the registered job log number acquired in step S803 corresponds to logs to be read.

In step S806, the CPU 301 registers the job logs acquired in step S805 in the job account DB 113. In step S807, the CPU 301 records the latest job log number acquired in step S804 in the storage unit 306 as the registered job log number.

A user interface example of the cost calculating application 114*a* will be described below using FIG. 9.

FIG. 9 shows a user interface example of the cost calculating application according to the first embodiment of the present invention.

On the cost calculating server 114 which installs the cost calculating application 114*a*, the cost calculating application 114*a* generates a cost calculating window 900 which displays the cost calculation results. The user can make character inputs and point inputs on this cost calculating window 900 using a keyboard and pointing device (e.g., a mouse) of the cost calculating server 114.

Reference numeral 901 denotes a function restriction table (previous month function restriction table) which indicates the function restrictions for respective departments until the previous month. Note that one month is set as a unit period. However, the present invention is not limited to such specific unit period. Rows include restriction items (single-side inhibition, minimum page layout, and color inhibition), and columns include department items (administrative department, planning department, and design department).

Check boxes are controls used to designate application/non-application of corresponding restrictions. A check box with a check indicates that the corresponding restriction is to be applied, and a check box without any check indicates that the corresponding restriction is not to be applied. This check operation is implemented by clicking the mouse button, and the check box is cyclically checked/unchecked in response to button clicking.

Of the restriction items, "single-sided inhibition" is a restriction that permits only double-sided printing. "Minimum page layout" indicates the minimum number of logical pages (pages of a document) to be laid out per face of a sheet. For example, if the value of "minimum page layout" is 2, it indicates that two or more logical pages are indispensable to be laid out per face of a sheet. "Color inhibition" is a restriction which inhibits color printing, that is, permits only monochrome printing.

Reference numeral 902 denotes a print cost table which shows print costs of the previous month of the departments shown in the function restriction table 901. The second leftmost cell indicates the cost of the previous month of the administrative department, the third and fourth cells indicate those of the planning department and design department, and the rightmost cell indicates the total cost of all the departments.

Reference numeral 903 denotes a temporary function restriction table (next month function restriction table) which sets temporary function restrictions used to simulate the cost after the next month. The temporary function restriction table 903 has the same contents as the function restriction table 901.

Reference numeral 905 denotes a toner unit price button, which is a control used to set a unit price for each paper size and for each color mode. Reference numeral 906 denotes a paper unit price button which is a control used to set a unit price for each paper size and for each paper type.

In this way, the cost calculating window 900 allows the operator to set and manage unit prices of resources (printing materials such as toners, inks, and the like, print media such as paper sheets, and the like) to be consumed upon using the functions of the device.

Reference numeral 907 denotes a simulation button, which is used to calculate the costs of the next month when the restrictions set on the temporary function restriction table 903 are applied, and to display the calculation results on a predicted cost table 904. Note that the predicted cost table 904 is a table used to display the simulated costs in the same order as in the print cost table 902.

Reference numeral 908 denotes a reflection button which is a control used to write the restrictions set on the temporary function restriction table 903 in the storage unit 306, and to change the function restriction information. Upon operation of this reflection button 908, the changed function restriction information is reflected (updated) in the function restriction database in the server (user information server 101, ticket issuing server 102, and the like) which serves as the function restriction server.

Reference numeral 909 denotes radio buttons which are controls used to switch a target period, and to designate a term of job logs used to calculate the costs. In FIG. 9, a black dot indicates "select", and a white dot indicates "deselect". Note that one of "previous period" and "same period last year" can be designated as the period. "Previous period" indicates a period immediately before the current period, and "same period last year" indicates the same period of the last year. Assume that one month is set as a unit period of the cost calculation, and the current period is November 2005. If "previous period" is designated, the costs are calculated for October 2005; if "same period last year" is designated, the costs are calculated for October 2004.

Figure 10:
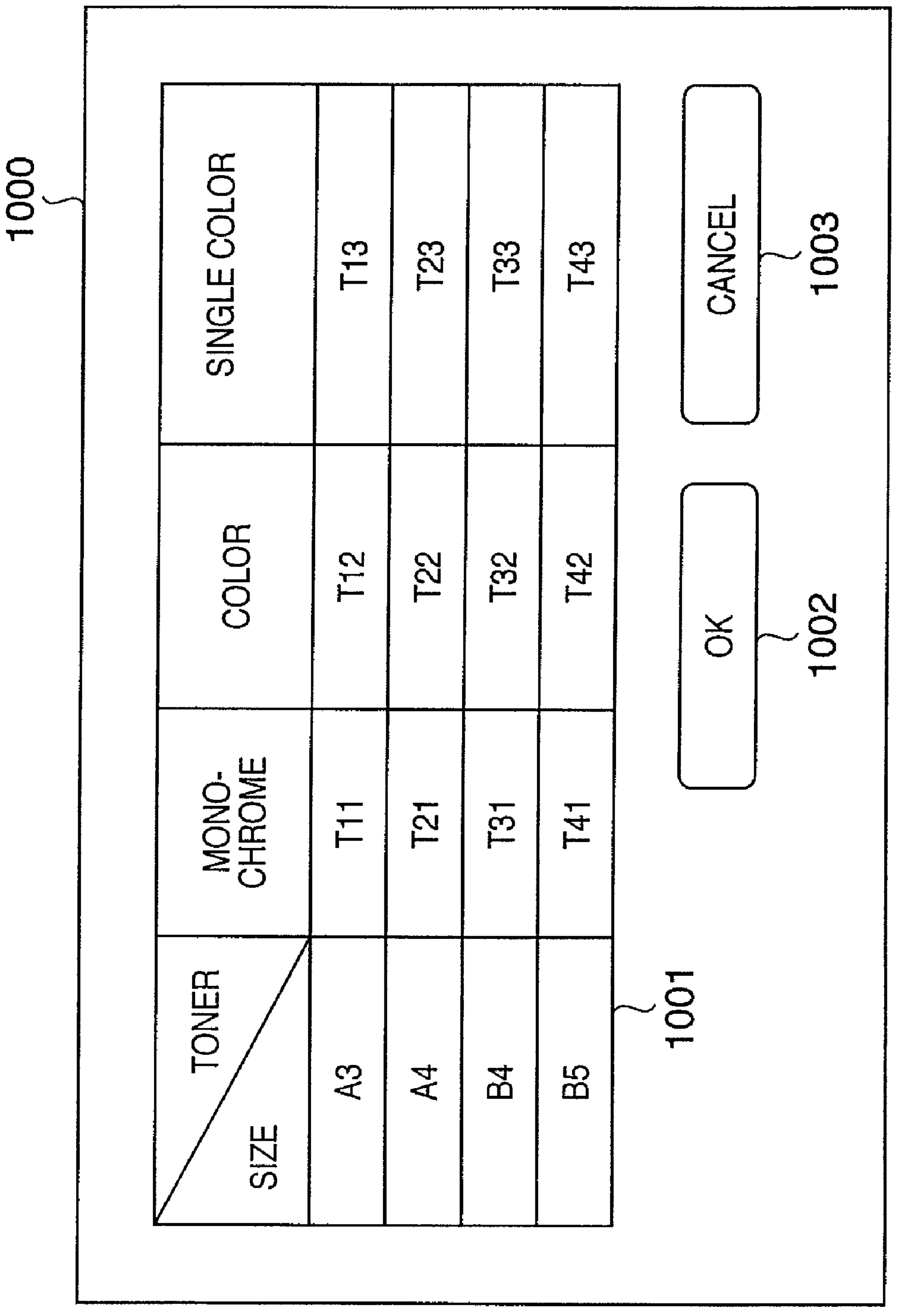
FIG. 10 shows an example of a toner unit price setting dialog according to the first embodiment of the present invention.

Upon operation of the toner unit price button 905 on the cost calculating window 900, a toner unit price setting dialog 1000 shown in FIG. 10 is displayed. Reference numeral 1001 denotes a toner unit price table, which allows the operator to set unit prices for respective paper sizes and for respective color modes to be used upon full-page printing. "Single color" is a case wherein only one type of toner other than black is used. T11 to T43 are numerical values to be arbitrarily set by the system administrator. Reference numeral 1002 denotes an OK button. Upon operation of this OK button 1002, the contents of the toner unit price table 1001 are saved, and display of the toner unit price setting dialog 1000 quits. Reference numeral 1003 denotes a cancel button. Upon operation of the cancel button 1003, display of the toner unit price setting dialog 1000 quits without saving the contents of the toner unit price table 1001.

Figure 11:
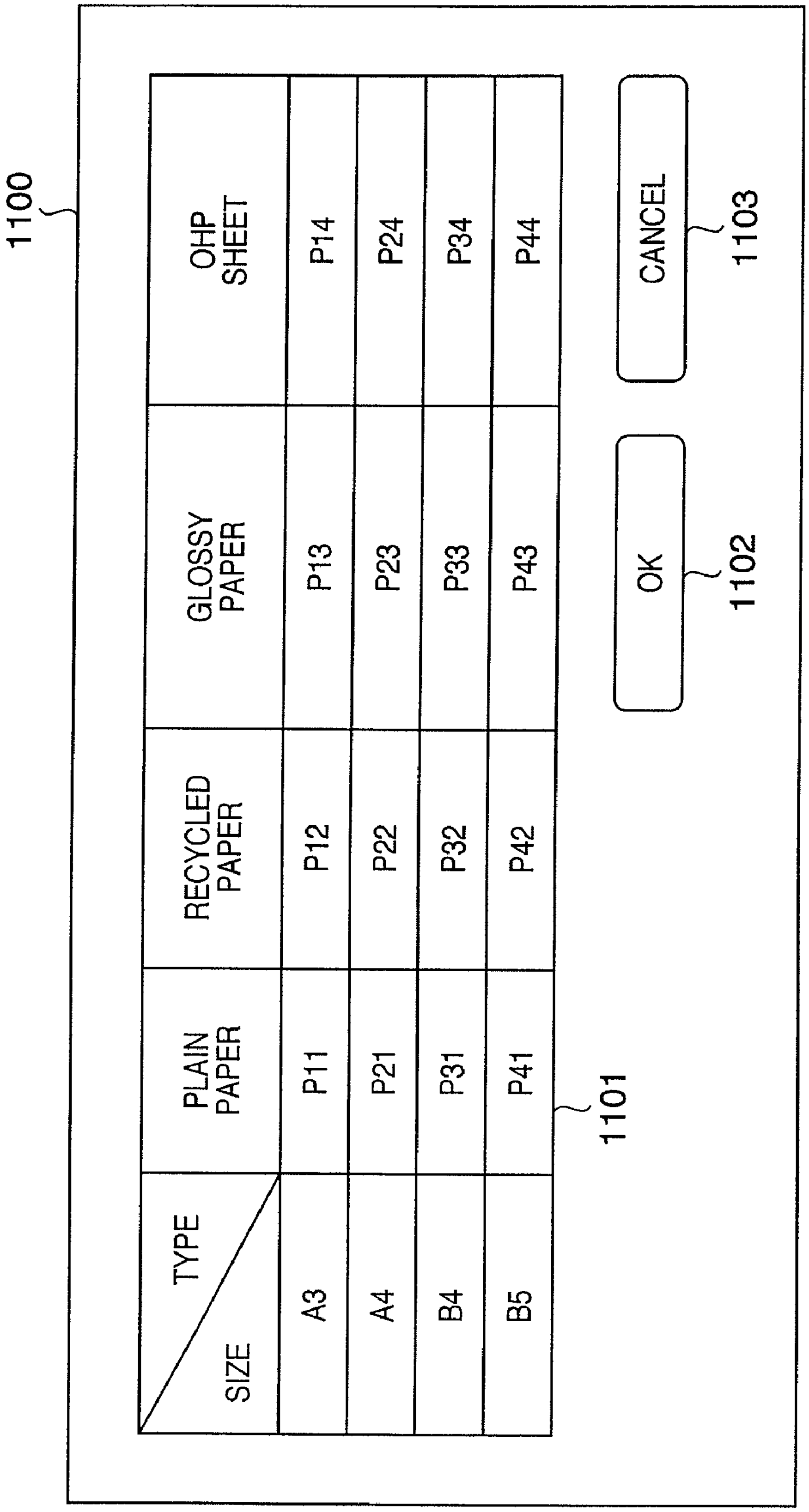
FIG. 11 shows a paper unit price setting dialog according to the first embodiment of the present invention.

Upon operation of the paper unit price button 906 on the cost calculation window 900, a paper unit price setting dialog 1100 shown in FIG. 11 is displayed. Reference numeral 1101 denotes a paper unit price table, which allows the operator to set unit prices per sheet for respective paper sizes and for respective paper types. P11 to P44 are numerical values to be arbitrarily set by the system administrator. Reference numeral 1102 denotes an OK button. Upon operation of this OK button 1102, the contents of the paper unit price table 1101 are saved, and display of the paper unit price setting dialog 1100 quits. Reference numeral 1103 denotes a cancel button. Upon operation of the cancel button 1103, display of the paper unit price setting dialog 1100 quits without saving the contents of the paper unit price table 1101.

In this way, the cost calculating window 900 displays the function restriction table 901 in contrast with the print cost table 902, and the temporary function restriction table 903 in contrast with the predicted cost table 904. In this way, the user can easily figure out the print costs required for the current function restrictions and increments/decrements of those predicted when the function restrictions are changed.

Since the user can determine settlement of changes of the function restrictions after confirmation of the increments/decrements of the predicted print costs as needed, system management closer to a function restriction state that the user intended can be implemented.

The operation of the cost calculating application 114*a* on the cost calculating server 114 will be described below using FIG. 12.

Figure 12:
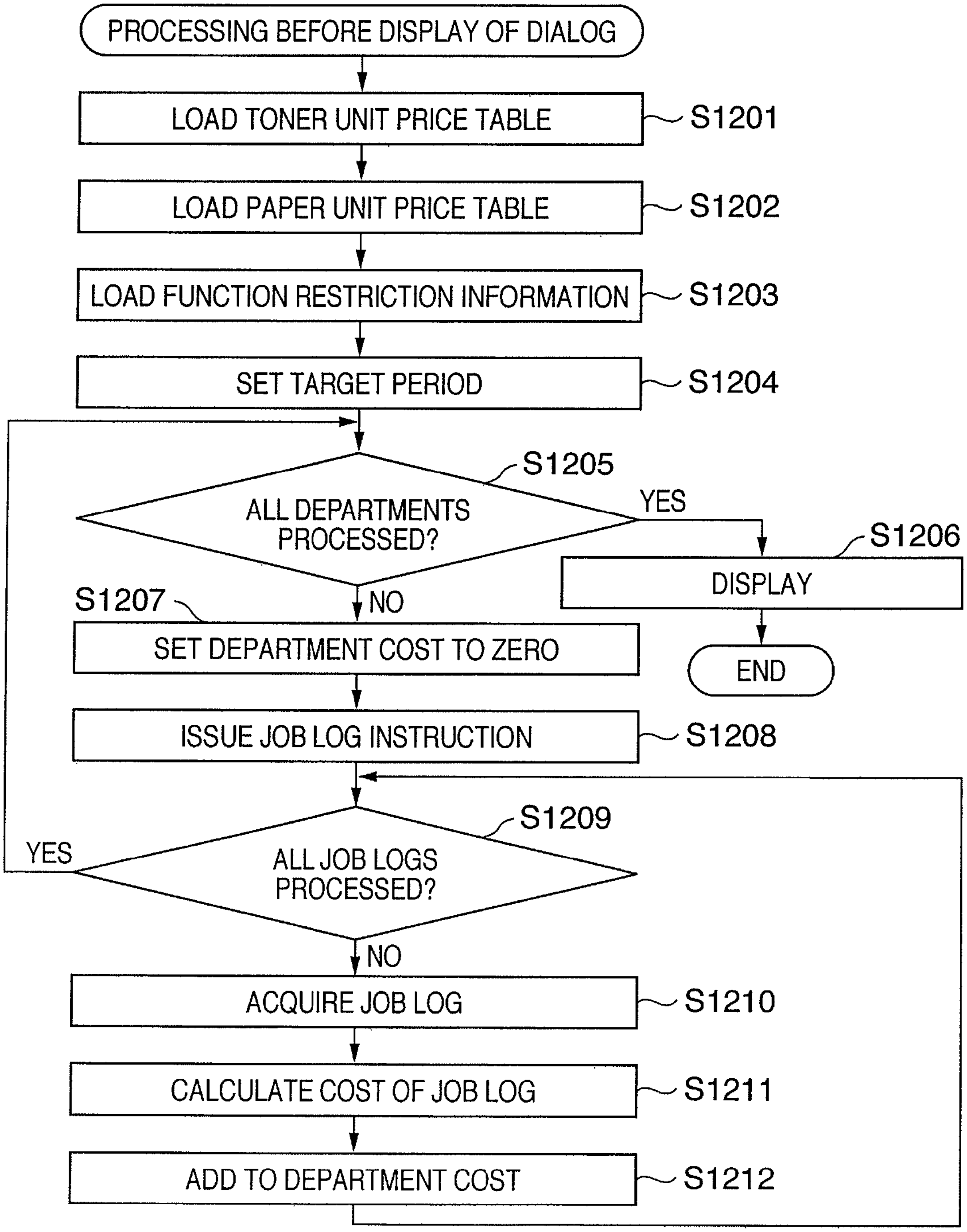
FIG. 12 is a flowchart showing the operation of the cost calculating application according to the first embodiment of the present invention.

FIG. 12 is a flowchart showing the operation of the cost calculating application according to the first embodiment of the present invention.

Note that the operation of the cost calculating application 114*a* shown in FIG. 12 is that upon generating various kinds of information which form the cost calculating window 900 shown in FIG. 9, and displaying them on the cost calculating window 900. Also, the operation of the cost calculating application 114*a* is implemented under the control of the CPU 301 of the cost calculating server 114.

In step S1201, the CPU 301 loads the toner unit price table as an example of unit price information from the storage unit 306. In step S1202, the CPU 301 loads the paper unit price table from the storage unit 306. In step S1203, the CPU 301 loads functional restriction information for respective departments from the user information server 101.

In step S1204, the CPU 301 issues an API to the OS (Operating System) to acquire the current date and time, and sets a month immediately before the current month as a target period.

The CPU 301 checks in step S1205 if the total costs of the individual departments have been calculated for all the departments included in the function restriction information acquired in step S1203. If the total costs of the individual departments have been calculated for all the departments (YES in step S1205), the process advances to step S1206. In step S1206, the CPU 301 generates and displays the cost calculating window 900 using the calculated costs.

On the other hand, if the total costs of the individual departments have not been calculated yet for all the departments (NO in step S1205), the process advances to step S1207.

In step S1207, the CPU 301 selects one department to be processed, and sets the total cost of that department to zero.

In step S1208, the CPU 301 issues, to the job account DB 113, an instruction (job log instruction) for acquiring job logs of the department selected in step S1207 for the target period set in step S1204.

The CPU 301 checks in step S1209 if all job logs have been processed. If all the job logs have been processed (YES in step S1209), the process advances to step S1205. On the other hand, if all the job logs have not been processed yet (NO in step S1209), the process advances to step S1210.

In step S1210, the CPU 301 acquires one job log to be processed based on the result in step S1208. In step S1211, the CPU 301 calculates the cost of the job log. Let CJ be the cost of a job log. Then, CJ is calculated by:

$$CJ = \text{number of pages} \times \text{toner cost} + \text{number of sheets} \times \text{paper cost}$$

For example, when the toner unit price table 1001 and paper unit price table 1101 are applied to a job log shown in FIG. 13, since the job log includes the number of pages=6, color mode=color, paper size=A4, paper type=plain paper, and the number of sheets=6, CJ is:

$$CJ = 6 \times T22 + 6 \times P21$$

In step S1212, the CPU 301 adds the job log cost in step S1211 to the total cost of the department which is being calculated, and the process returns to step S1209.

The simulation to be executed by the cost calculating application 114*a* upon operation of the simulation button 907 on the cost calculating window 900 will be described below using the flowchart of FIG. 14.

Figure 14:
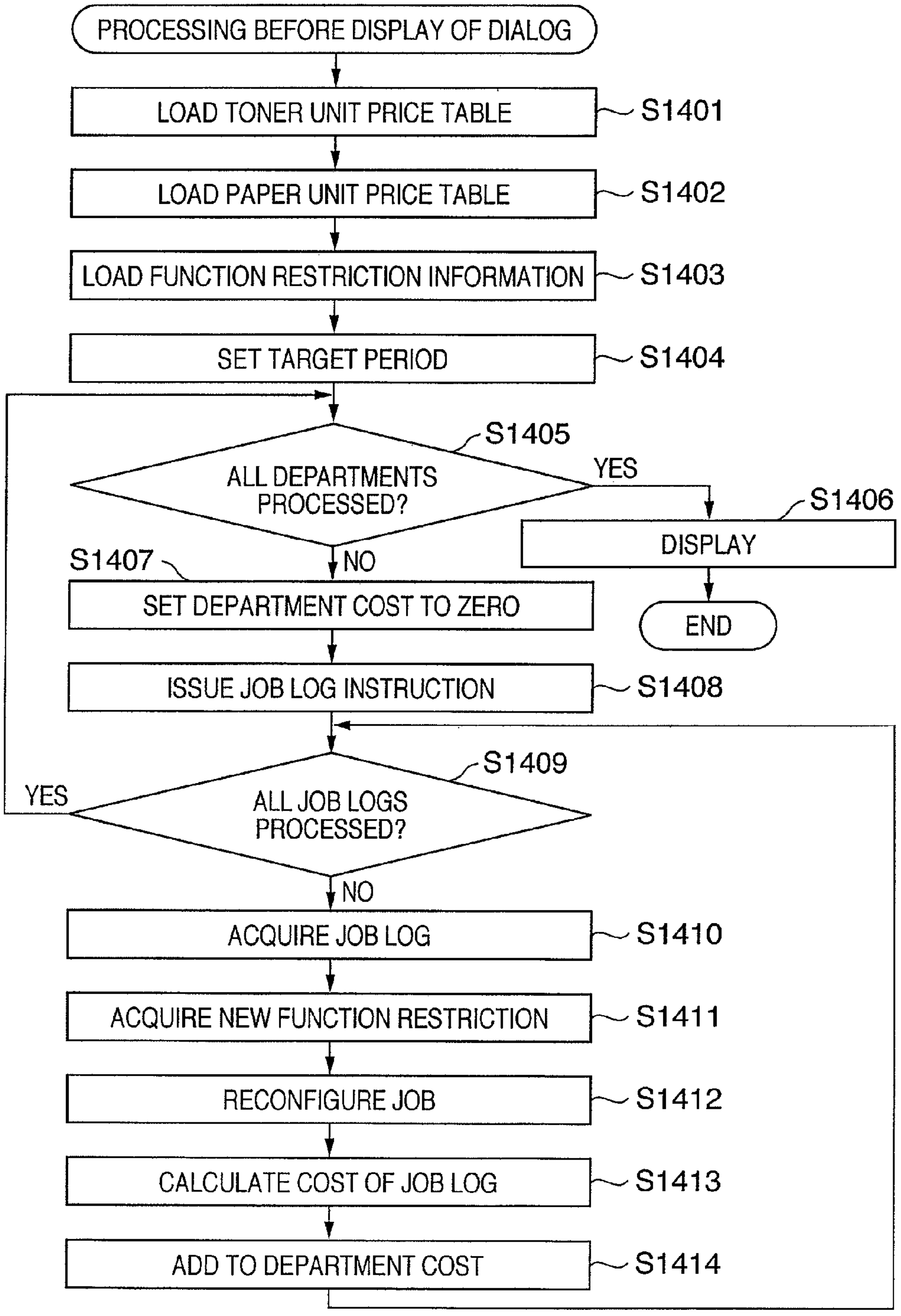
FIG. 14 is a flowchart showing the simulation by the cost calculating application according to the first embodiment of the present invention.

FIG. 14 is a flowchart showing the simulation to be executed by the cost calculating application according to the first embodiment of the present invention.

Note that the processes in steps S1401 to S1410 are the same as those in steps S1201 to S1210 shown in FIG. 12, and a detailed description thereof will be omitted.

In step S1411, the CPU 301 acquires function restrictions set for the department to be processed from the temporary function restriction table 903 which is being edited on the cost calculating window 900 in FIG. 9.

In step S1412, the CPU 301 reconfigures the job log taking the function restrictions acquired in step S1411 into consideration.

Practical processing contents will be described below using the cost calculating window 900 in FIG. 9 and the example of the job log shown in FIG. 13. The current function restrictions of the department "planning department" on the temporary function restriction table 903 in FIG. 9 are "single-sided inhibition" and "minimum page layout: 4". When these function restrictions are applied to the job log in FIG. 13, the job log is changed as follows.

Number of pages=number of logical pages/page layout=12/4=3

Number of sheets=value obtained by counting fractions as one of (number of pages/(2 for double-sided or 1 for single-sided))=3/2=2

In step S1413, the CPU 301 calculates the cost of the job log as in step S1211. Let CJ1 be a new cost. Then, CJ1 is calculated by:

$$CJ1=3\times T22+2\times P21$$

That is, the CPU 301 calculates the amount of consumption of paper sheets as an example of the resources after the function restrictions are set by calculating the number of sheets. The CPU 301 also calculates the amount of consumption of toners and the like as an example of the resources after the function restrictions are set by calculating the number of pages. Then, the CPU 301 calculates the cost using the number of pages, the number of sheets, and unit prices of respective resources as the values associated with the amount of consumption of these resources.

Upon comparison with the cost CJ calculated in step S1211, their difference is given by:

$$\begin{aligned}\text{Difference} &= CJ - CJ1\\ &= (6\times T22+6\times P21)-(3\times T22+2\times P21)\\ &= 3\times T22+4\times P21\end{aligned}$$

The sum total of such differences becomes the difference of the total cost of each department before and after changes of the function restrictions.

In step S1414, the job log cost in step S1211 is added to the total cost of the department which is being calculated, and the process returns to step S1409.

In step S1406, the calculation result obtained via the processes in steps S1409 to S1414 is reflected (updated) in the predicted cost table 904 on the cost calculating window 900 shown in FIG. 9. Also, the reduction of the amounts of consumption of the respective resources upon application of the function restrictions can be displayed. For example, assume that 2-UP printing and double-sided printing are forcibly set as function restrictions. How many sheets are consumed in such case can be calculated using the job log.

As described above, according to the first embodiment, the user can easily confirm a cost reduction or increase after the function restrictions are imposed. In this way, more appropriate function restrictions can be set according to the cost which can be carried in terms of printing, and printout results which are more appropriately suited to the purposes intended can be obtained within the range of the allocated cost.

Second Embodiment

In the arrangement of the first embodiment, the method of changing the function restrictions for respective departments has been described. This embodiment will describe an example in which the present invention is applied to respective roles in place of the departments. A role describes a set of access authorities based on the role of each user.

FIG. 15 shows a function restriction table obtained by re-configuring the function restriction table 901 on the cost calculating window 900 shown in FIG. 9 for respective roles.

FIG. 15 shows, for example, three kinds of roles: GeneralUser (general user), Manager (manager), and Administrator (administrator). In this case, the function restrictions are managed for respective roles in place of the departments.

A program which runs on each of the devices such as the computers (client PCs 211 and 212 and server PC 221) and multi function peripherals 231 and 232 may be externally installed and may be executed by the device. In this case, an information group including that program is loaded onto the device from an external storage medium such as a CD-ROM, flash memory, floppy® disk, or the like or via an e-mail message or a network such as personal computer communications or the like. The present invention can also be applied to a case wherein the program is supplied to the device in this way.

Figure 16:
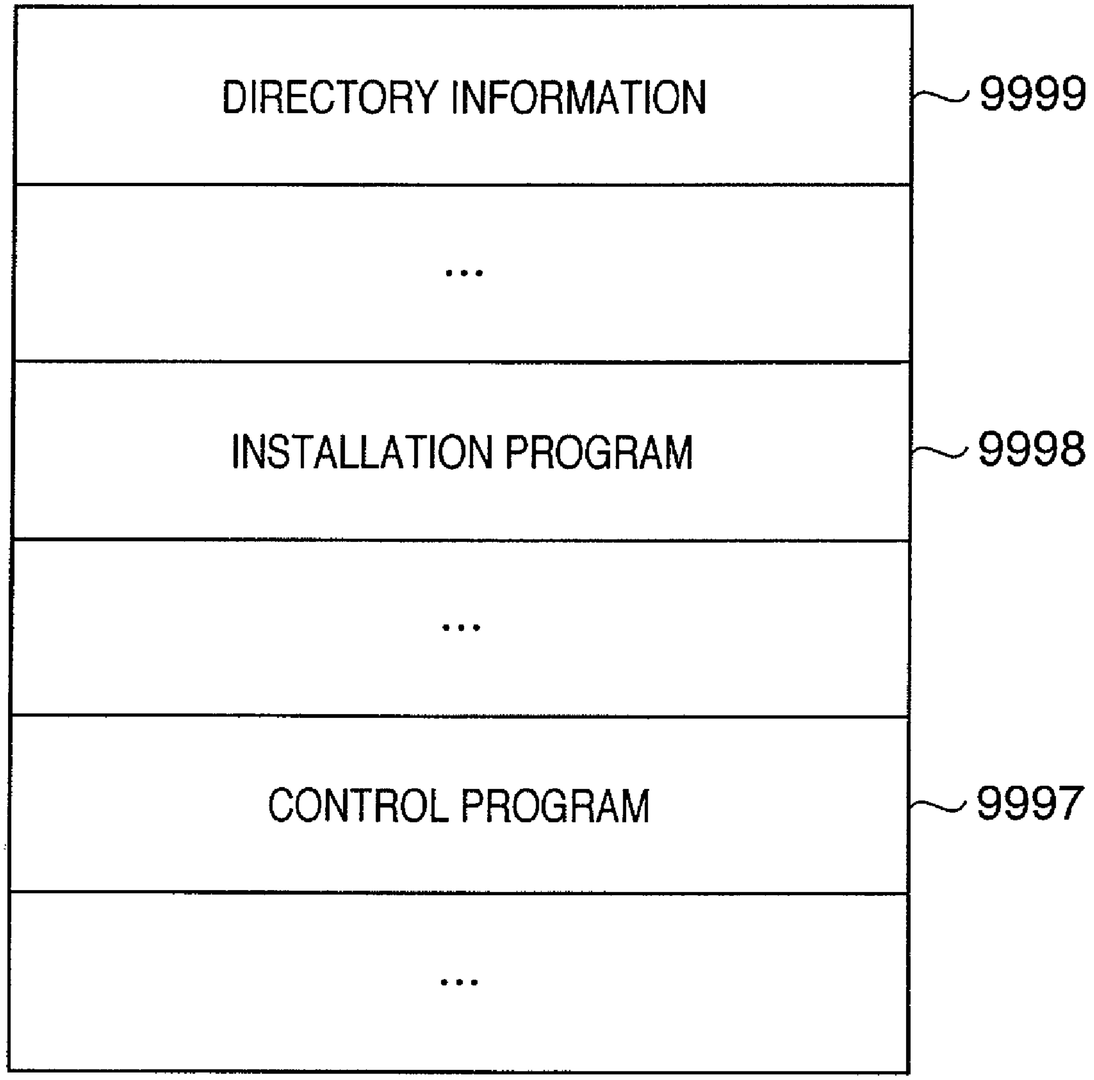
FIG. 16 shows the memory map of a CD-ROM as an example of a storage medium.

FIG. 16 shows the memory map of a CD-ROM as an example of the storage medium.

Reference numeral 9999 denotes an area that stores directory information, which indicate the locations of subsequent areas, that is, an area 9998 that stores an installation program, and an area 9997 that stores the control program of the print clients or network printers. The area 9998 stores the installation program. The area 9997 stores the control program of the computer or the multi function peripheral.

Upon installing the control program of the computer or multi function peripheral according to the present invention in the computer or multi function peripheral, the installation program stored in the area 9998 that stores the installation program is loaded onto the system, and is executed by the CPU 301. The installation program executed by the CPU 301 then reads out the control program from the area 9997, and installs the readout program in the computer or multi function peripheral.

The first and second embodiments have exemplified the case wherein the print costs are calculated upon using the print function of the MFP 104 or 109. However, the present invention is not limited to this. For example, the present invention can be applied to a case wherein the costs incurred upon using each of available functions (e.g., a scanner function, FAX function, and data send function) of the MFP 104 or 109 are calculated.

Other Embodiments

The preferred embodiments of the present invention have been explained, and the present invention can be practiced in the forms of a system, apparatus, method, program, storage medium (recording medium), and the like. More specifically, the present invention can be applied to either a system constituted by a plurality of devices, or an apparatus consisting of a single equipment.

Note that the present invention includes the following case. That is, a program of software that implements the functions of the aforementioned embodiments (programs corresponding to the illustrated flowcharts in the above embodiments) is directly or remotely supplied to a system or apparatus. Then, the invention is achieved by reading out and executing the supplied program code by a computer of that system or apparatus.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as long as they have the program function.

A recording medium for supplying the program, for example, includes a floppy® disk, hard disk, and optical disk. Furthermore, the recording medium includes a magneto-optical disk, MO, CD-ROM, CD-R, CD-RW, magnetic tape, nonvolatile memory card, ROM, DVD (DVD-ROM, DVD-R), and the like.

As another program supply method, connection is established to a home page on the Internet using a browser of a client computer. Then, the program may be supplied by downloading the computer program itself of the present invention or a compressed file containing an automatic installation function from the home page to a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional processing of the present invention by the computer.

Also, a storage medium such as a CD-ROM or the like, which stores the encrypted program of the present invention, may be delivered to the user. The user who has cleared a predetermined condition may be allowed to download key information that decrypts the encrypted program from a home page via the Internet. The encrypted program may be executed using that key information to be installed on a computer, thus implementing the present invention.

The functions of the aforementioned embodiments may be implemented by executing the readout program. In addition, the functions of the aforementioned embodiments may also be implemented by some or all of actual processing operations executed by an OS or the like running on the computer based on an instruction of that program.

Furthermore, the functions of the aforementioned embodiments can be implemented after the program read out from the recording medium is written in a memory of an expansion board or a function expansion unit which is inserted into or connected to the computer. That is, the functions of the aforementioned embodiments can also be implemented by some or all of actual processes executed by a CPU or the like arranged in the function expansion board or unit based on the instruction of that program.

According to this embodiment, an information processing apparatus which can implement more appropriate function restrictions according to the given costs, and allows the user to easily recognize cost efficiency with respect to the processing, a control method thereof, and a program thereof can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-149023 filed May 29, 2006, which is hereby incorporated by reference herein in its entirety.

What is claimed is:

1. An information processing apparatus for calculating a consumption amount of a resource upon using a function of an image processing apparatus, that processes a received job, within a range of function restriction information, said information processing apparatus comprising:

a first acquisition unit adapted to acquire function restriction information used to restrict use of the function of the image processing apparatus;

a second acquisition unit adapted to acquire job log data of a job processed using the function of the image processing apparatus;

a change unit adapted to change the function restriction information acquired by said first acquisition unit;

a calculation unit adapted to calculate the consumption amount of the resource upon processing the job included in the job log data acquired by said second acquisition unit by applying the changed function restriction information in order to simulate the consumption amount of the resource upon using the function of the image processing apparatus within the changed function restriction information;

an output unit adapted to output based on the calculation result of said calculation unit; and a setting unit adapted to set unit price information of the resource, wherein the resource includes print sheets, and wherein said calculation unit further comprises:

a first calculation unit adapted to calculate a first cost incurred upon using the function of the image processing apparatus within a first designated period based on unit price information set by the setting unit, the job log data acquired by said second acquisition unit, and the function restriction information before change by said change unit.

a second calculation unit adapted to calculate a second cost incurred upon using the function of the image processing apparatus within a second designated period based on unit price information set by the setting unit, the job log data acquired by said second acquisition unit, and the function restriction information changed by said change unit; and a generation unit adapted to generate a calculation result window that displays the first cost and the second cost in contrast to each other.

2. The apparatus according to claim 1, further comprising:

an instruction unit adapted to instruct to update the function restriction information changed by said change unit; and a transmission unit adapted to transmit the function restriction information changed by said change unit to a management apparatus that manages the function restriction information based on the instruction of said instruction unit, so as to update the function restriction information.

3. The apparatus according to claim 1, further comprising a setting unit adapted to set unit price information of the resource, wherein the unit price information includes at least one of a printing material and a printing medium used in the image processing apparatus, and said calculation unit calculates a cost incurred according to the consumption amount of the resource.

4. The apparatus according to claim 1, wherein said change unit changes the function restriction information for at least one user, a department, and a role.

5. The apparatus according to claim 1, further comprising a switching unit adapted to switch a calculation target period of said calculation unit.

6. The apparatus according to claim 1, wherein the calculation result window includes:

first and second display areas which respectively display the first cost and the second cost;

a control area which displays respective pieces of function restriction information for respective management units used to manage the function restriction information, and accepts a change;

a setting field used to set the unit price information;

an instruction field used to instruct said second calculation unit to calculate the second cost;

an update instruction field used to instruct to update the function restriction information changed by said change unit; and a switching field used to switch a calculation target period of said calculation unit.

7. A method of controlling an information processing apparatus for calculating a consumption amount of a resource upon using a function of an image processing apparatus, that processes a received job, within a range of function restriction information, said method of controlling the information processing apparatus comprising the steps of:

acquiring function restriction information used to restrict use of the function of the image processing apparatus;

acquiring job log data of a job processed using the function of the image processing apparatus;

changing the acquired function restriction information;

calculating the consumption amount of the resource upon processing the job included in the acquired job log data by applying the changed function restriction information in order to simulate the consumption amount of the resource upon using the function of the image processing apparatus within the changed function restriction information;

outputting the calculation result; and a step of setting unit price information of the resource, wherein the resource includes print sheets, and wherein the step of calculating further comprises the steps of:

calculating a first cost incurred upon using the function of the image processing apparatus within a first designated period based on unit price information set in the step of setting, the job log data acquired in the step of acquiring, and the function restriction information before change in the step of changing;

calculating a second cost incurred upon using the function of the image processing apparatus within a second designated period based on unit price information set in the step of setting, the job log data acquired in the step of acquiring, and the function restriction information changed in the step of changing; and generating a calculation result window that displays the first cost and the second cost in contrast to each other.

8. The method according to claim 7, further comprising the steps of:

instructing to update the function restriction information changed by said change step; and transmitting the function restriction information changed in the step of changing to a management apparatus that manages the function restriction information based on the instruction in the step of instructing, so as to update the function restriction information.

9. The method according to claim 7, further comprising a step of setting unit price information of the resource, wherein the unit price information includes at least one of a printing material and a printing medium used in the image processing apparatus, and in the step of calculating a cost incurred is calculated according to the consumption amount of the resource.

10. The method according to claim 7, wherein in the step of changing the function restriction information is changed for at least one user, a department, and a role.

11. The method according to claim 7, further comprising a step of switching a calculation target period of the step of calculating.

12. The method according to claim 7, wherein the calculation result window includes:

first and second display areas which respectively display the first cost and the second cost;

a control area which displays respective pieces of function restriction information for respective management units used to manage the function restriction information, and accepts a change;

a setting field used to set the unit price information;

an instruction field used to instruct to calculate the second cost;

an update instruction field used to instruct to update the function restriction information changed in the step of changing; and a switching field used to switch a calculation target period of the step of calculating.

13. A non-transitory computer-readable storage medium storing a computer program for making a computer execute a control method according to claim 7.

* * * * *

UNITED STATES PATENT AND TRADEMARK OFFICE

CERTIFICATE OF CORRECTION

PATENT NO. : 8,027,047 B2
APPLICATION NO. : 11/749482
DATED : September 27, 2011
INVENTOR(S) : Isamu Nakagawa It is certified that error appears in the above-identified patent and that said Letters Patent is hereby corrected as shown below:

COVER SHEET

Please insert Assignee item (73), information as follows:

Assignee: -- CANON KABUSHIKI KAISHA --

Signed and Sealed this
Third Day of January, 2012

David J. Kappos

David J. Kappos
*Director of the United States Patent and Trademark Office*